Oct. 30, 1934.    S. STRATY    1,978,608

WELDED NOZZLE FOR JACKETED VESSELS

Filed June 21, 1933

INVENTOR.
Stephen Straty
BY
ATTORNEY.

Patented Oct. 30, 1934

1,978,608

UNITED STATES PATENT OFFICE 1,978,608

WELDED NOZZLE FOR JACKETED VESSELS

Stephen Straty, Milwaukee, Wis., assignor to A. O. Smith Corporation, Milwaukee, Wis., a corporation of New York Application June 21, 1933, Serial No. 676,779

9 Claims. (Cl. 285—106)

This invention relates to a welded nozzle for jacketed pressure vessels and autoclaves such as are employed in the chemical industries.

The object of the invention is to provide a nozzle or manway connection for such a vessel which will be more free from strains and warpage.

Other objects will appear from the following description of the preferred embodiment of the invention which is illustrated in the accompanying drawing.

Figure 1:
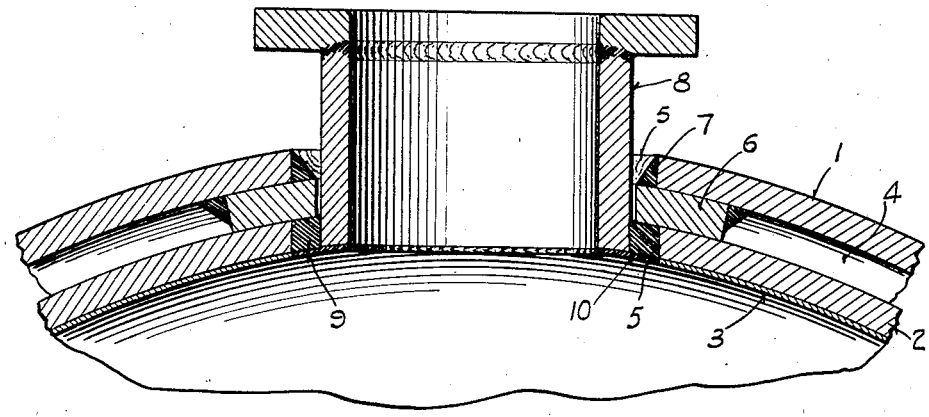

Figure 1 of the drawing is a longitudinal center section through a manway showing its connection to a vessel, only a portion of the vessel wall being shown.

Figure 2:
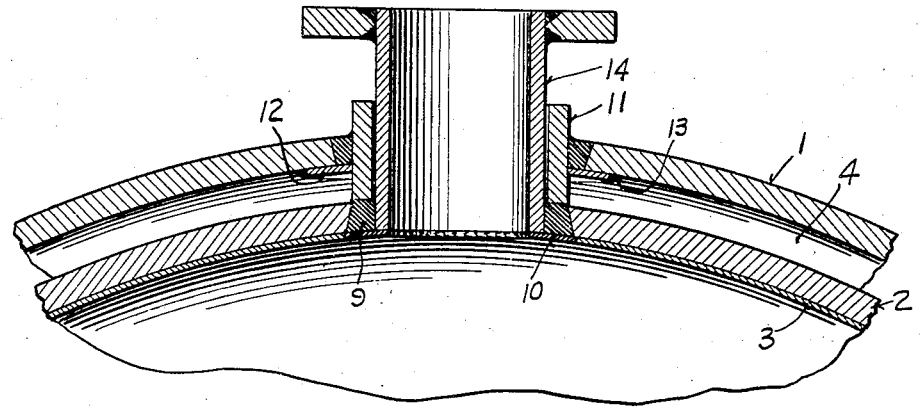

Fig. 2 is a similar section showing a modified form of construction as applied to nozzles and small openings.

The vessel is ordinarily constructed of an outer wall or shell 1, an inner wall or shell 2 spaced from the outer wall and having a corrosion resisting alloy lining 3 therein.

Where it is desired to secure an alloy manway to the vessel, it has been the practice heretofore to make the requisite opening through the two vessel shells or walls and to weld the manway neck to each of the shells. This has been found to be unsuitable for high temperature process equipment since the unequal expansion and contraction of the two shells under changing temperature conditions sets up excessive strains in the manway tending to crack either the manway or the shells.

In carrying out the present invention, the space 4 between the walls 1 and 2 of the vessel is closed at the manway opening 5 by a reenforcing ring plate or collar 6 of a thickness equal to the spacing of the two walls.

In securing the reenforcing plate 6 in position, the opening 5 in each wall is made larger than is required to receive the manway, while the inner diameter of the plate 6 is only slightly in excess of the outer diameter of the manway neck. Fillet welds 7 are made at the juncture between the plate 6 and outer wall 1 and also at the periphery of the plate 6 to weld it to the wall 1.

The manway neck 8, which is preferably of special corrosion resistant alloy, is positioned within the opening 5, as illustrated in Figure 1, with its inner end extending approximately to the inner surface of the shell 2. In this manner, a welding groove is formed between the inner edge of the shell 2 and the outer circumference of the manway neck 8, having the reenforcing plate 6 as its bottom.

Weld metal 9 is deposited in the welding groove, preferably by means of the metallic arc welding process, to weld the inner shell 2, reenforcing plate 6 and manway neck 8 into an integral structure. Alloy weld metal 10 is preferably deposited over the weld to make a corrosion resistant joint.

The manway 8 is not welded to the outer shell 1 and, therefore, the expansion and contraction of the outer shell has no effect upon the manway.

In the modification illustrated in Fig. 2, as applied to smaller openings in the vessel, such as nozzles, instead of a reenforcing plate 6 arranged between the two shells of the vessel, a tubular collar 11 is employed. The collar 11 extends through the opening in the outer wall 1 and is welded to the wall by employing a light reenforcing ring or backing strip 12 beneath the wall to form the bottom of a welding groove as illustrated in Fig. 2. The strip 12 may be welded to the outer shell 1 at the periphery of the strip as shown at 13.

The collar 11, nozzle neck 14 and shell 2 are welded together in the same manner as the reenforcing plate 6, neck 8 and shell 2 of Figure 1.

In both constructions, the necks are of slightly less diameter than the reenforcing plate 6 or collar 11. This allows for independent expansion and contraction of these parts. Furthermore, the necks are welded to the vessel wall only at the inner ends of the necks. This permits flexibility in movement between the parts without creating excessive strains.

The necks may be made fairly thin while all reenforcing is accomplished by the plate 6 or collar 11. This permits considerable economy where the necks are of special alloy construction.

Various modifications may be made within the scope of the accompanying claims.

I claim:

1. In a double walled pressure vessel, a manway or nozzle connection comprising a tubular neck extending into an opening in the vessel walls, and a plate or collar encircling and spaced from said neck and reenforcing the vessel walls at the opening, said collar being welded to both walls of the vessel, and said neck extending through said collar and being welded at its inner end only to the inner wall of the vessel.

2. In a jacketed vessel having an opening therein for receiving a fitting, a welded connection comprising a fitting disposed within said opening, a collar surrounding and spaced from said fitting within the opening, weld metal uniting the collar to the jacket, and weld metal uniting the fitting and the collar to the shell.

3. In a jacketed vessel having an opening formed through the jacket and the shell of the vessel, a welded connection comprising a fitting disposed within said opening, a collar surrounding and spaced from the fitting, said collar being attached by welding to both the jacket and the shell and spacing them apart, and weld metal uniting the fitting to the shell.

4. In a vessel having a shell and a jacket for said shell, said vessel having an opening through the shell and the jacket for receiving a tubular fitting, a welded connection comprising a tubular fitting extending into said opening with its inner end approximately flush with the outer surface of the shell, a collar surrounding and spaced from the fitting, said collar having its inner face spaced away from a surface flush with the inner surface of the shell, weld metal uniting the collar to the jacket, and weld metal deposited in the groove formed by the shell, the fitting and the collar to unite the shell to the fitting and the collar.

5. In a vessel having a shell and a jacket for said shell, said vessel having an opening through the jacket and the shell for receiving a tubular fitting, a welded connection comprising a tubular fitting smaller than the opening extending into said opening with its end substantially flush with the inner surface of the shell of the vessel, a reenforcing collar surrounding and spaced from the fitting, said collar spacing the jacket and the shell, weld metal uniting the collar to the jacket, and weld metal uniting the end of the tubular connection and the inner face of the collar to the shell.

6. In a jacketed vessel having a shell with an opening therein for receiving a tubular fitting and spaced from the shell a jacket with an opening larger than and in alignment with the opening in the shell, a welded connection comprising a tubular fitting disposed within the openings in the shell and the jacket, a collar of substantially the same size as the opening in the shell surrounding and spaced from the fitting, a portion of said collar being disposed within the opening in the jacket and the lower end of the collar being spaced back from a position flush with the inner surface of the shell, weld metal uniting the collar to the jacket, and weld metal uniting the fitting and the collar with the shell.

7. In a jacketed vessel having a shell with an opening therein for receiving a tubular fitting and spaced from the shell a jacket with an opening larger than and in alignment with the opening in the shell, a welded connection comprising a tubular fitting smaller than the opening in the shell disposed within the openings in the shell and the jacket, a collar smaller than the opening in the jacket surrounding and spaced from the fitting, a portion of said collar being disposed within the opening in the jacket and the lower end of the collar being spaced back from a position flush with the inner surface of the shell and substantially closing the space between the shell and the tubular fitting, means forming a welding dam closing the space between the jacket and the collar, weld metal deposited in the groove defined by the jacket, the welding dam and the collar, and weld metal deposited in the groove defined by the shell, the collar and the fitting.

8. In a jacketed vessel having a shell and a jacket covering said shell, said vessel having an opening through the shell and the jacket for receiving a tubular fitting, a welded connection comprising a tubular fitting smaller than the opening disposed in the opening, a collar surrounding and spaced from the fitting, a portion of the collar lying opposite the jacket and the lower end of the collar being substantially flush with the outer surface of the shell, weld metal uniting the collar to the jacket, weld metal uniting the collar to the shell, and weld metal uniting the end of the fitting to the inner end of the collar.

9. In a jacketed vessel having a shell and a jacket spaced from the shell, said vessel having an opening through the shell and the jacket for receiving a tubular fitting, a tubular connection smaller than the opening extending into the opening with its end spaced back somewhat from a position flush with the inner surface of the shell, a collar of less outer size than the opening in the vessel surrounding and spaced from the fitting, a portion of the collar lying opposite the jacket and the lower end of the collar being substantially flush with the outer surface of the shell, means forming a welding dam closing the space between the jacket and the collar, means forming a welding dam closing the space between the shell and the collar, weld metal deposited in the groove defined by the jacket, the welding dam and the collar, weld metal deposited in the groove defined by the shell, the welding dam and the collar, and weld metal uniting the end of the fitting to the inner end of the collar.

STEPHEN STRATY.